United States Patent Office 3,158,473
Patented Nov. 24, 1964

3,158,473
METHOD FOR PRODUCING COMPOSITE BODIES
Arno Gatti, Schenectady, N.Y., assignor to General Electric Company, a corporation of New York
No Drawing. Filed Aug. 27, 1962, Ser. No. 219,771
4 Claims. (Cl. 75—206)

This invention relates to methods for producing sintered composites and more particularly to an improved method for producing sintered composites having a dispersed particle phase which improves the physical properties of the matrix phase.

This application is a continuation-in-part of applicant's copending application Serial No. 127,110, filed July 27, 1961, now abandoned, and assigned to the same assignee as the present invention.

The use of powder processing techniques has expanded greatly during recent years, particularly in the metallurgical and ceramic fields, due at least in part to the variety of shapes producible and the over-all good physical properties attainable. However, despite the vast improvement and growth occurring in the powder processing field, the demand for materials capable of withstanding severe operating conditions has increased even more. Methods for improving the strength, corrosion-resistance, hardness and density of powder bodies, for example, have been continuously sought.

It is a principal object of this invention to provide a process for increasing the hardness of sintered metal compact bodies.

An additional object of this invention is to provide a process for producing sintered metal compact bodies having a finely divided, evenly dispersed second phase imparting increased physical properties to the bodies.

Other objects and advantages will be in part obvious and in part explained by reference to the accompanying specification.

The process is generally one wherein finely divided, reducible particles of a compound of a metal which is to serve as a matrix metal are mixed with finely divided metal oxide particles which are to constitute a dispersion within the matrix metal. The matrix metal compound particles are reduced to the metallic state, to the exclusion of the dispersion metal oxide particles, and the thus-reduced mixture subjected to an environment which renders the matrix metal particles non-pyrophoric. The passivated mixture is then comminuted in a suitable liquid medium which is nonoxidizing to the materials being physically reduced to break up any agglomerates which may have formed during the reduction of the matrix metal compound particles. Agglomeration or compaction of the powder is then effected to form a body of selected green strength and fired for a time sufficient to remove any residual liquid which may have carried over from the comminuting operation. A second agglomeration or compaction and simultaneous firing is then carried out to increase the density and hardness.

While the present invention is particularly applicable to metals such as iron, nickel, cobalt, copper, molybdenum, tungsten, tantalum, and niobium, the general process may obviously be successfully carried out on other metals. Similarly, for the specific metals mentioned, the dispersed phase may be any one of the oxides of magnesium, aluminum, zirconium, thorium, hafnium or calcium, but here, once again, other metal oxides will, in many instances, be suitable dispersion agents. The principal criterion which must be met is to make certain that the compound of the metal which will form the matrix metal can be reduced selectively, that is, that the dispersion metal oxide will remain in the oxide condition during reduction of the matrix metal compound. Reduction temperatures can vary between 400 to 700° C. and while in some instances somewhat lower temperatures might be used, the 700° C. upper limit should not be exceeded.

Various types of compounds of those metals to be used as the matrix metal can be used, the basic requirement which must be met being that the free energy of the compound be less than the free energy of formation of the dispersion metal oxide and be capable of selective reduction. Oxides and sulfides are examples of two broad classes of metal compounds whose free energies of formation render them suitable as materials for use in the present process. It should also be pointed out that the metal oxide dispersant can start out initially as some oxide compound which is reducible to the oxide condition, but no further, during the reduction of the metal compound used to supply the matrix metal.

The metal oxide content will advantageously fall within the range of from 0.5 to 10.0 weight percent, depending upon the particular metal matrix and the results desired. Generally, iron, nickel, cobalt and copper can contain up to 10 weight percent of an oxide phase due to the good ductility of these metals. On the other hand, the more refractory metals, viz. molybdenum, tungsten, tantalum and niobium, should normally contain no more than 6 weight percent of an oxide because their lack of ductility renders them extremely difficult to work.

The present process is particularly applicable to submicron-size particles, although larger particles can be used if desired. The use of small particles makes it possible to obtain a fine, even dispersion of submicron-size metal oxide particles in a metal matrix formed by the reduced matrix metal compound, thereby giving greatly improved physical properties, specifically hardness and strength. The particle sizes used in the present instance are on the order of up to about 0.5 micron.

Considering a specific application of the present invention, a quantity of alumina, $Al_2O_3$, specifically 10 weight percent, was mixed with iron oxide, $Fe_2O_3$, the particle size of the alumina being on the order of 0.1 micron and the particle size of the iron oxide also being 0.1 micron. These materials were thoroughly mixed by mechanical means and reduced in hydrogen at 500° C. The material present after the reduction was submicron-size iron particles and alumina particles of similar size.

The material was then immediately subjected to a passivating liquid medium, specifically liquid nitrogen, capable of rendering the very small, normally pyrophoric iron particles stable in air. Other liquids, such as carbon tetrachloride, can be used in some instances, although liquid nitrogen is easily the most preferred passivating medium. By carrying out this passivating step, it was possible to handle the powders in air without concern for oxidation of the iron particles. The mixture was then placed in a ball mill and ground to break up any agglomerates formed during the reducing operation. The comminuting action can be carried out in any suitable liquid medium which is non-reactive with the materials being ground and other types of comminuting or grinding apparatus can be used. In the present case, trichloroethylene containing about 5 percent paraffin was used. Other liquids such as kerosene can be used if desired.

Upon completion of grinding, the material was placed into a double-acting die and compressed to form a green body, the particular compacting pressure used not being critical since the main function of this step is to remove some of the excess liquid medium carried over from the grinding operation. The green compact was then fired at a temperature below about 700° C. to remove any volatiles, such as paraffin, which may have been carried over from the grinding step. It will be appreciated that other, well-known forming methods are acceptable; for example, slip casting is an extremely useful method for shaping intricate bodies from a fluidized mass of the type obtained from the ball milling operation.

The final step in producing high density sintered bodies is the compaction and simultaneous firing operation at temperatures between about 700° C. and 800° C. The compact must be heated to a temperature imparting plasticity but not high enough to product excessive diffusion of constituents.

The green body can be compacted by any suitable means such as extrusion or simple hot pressing. For example, to form shapes such as rods, tubes and the like, extrusion procedures are effective. Extrusion is normally carried out by encasing the green body in a can and forcing the can and its contents through a die at about 700° C. to 800° C.

Rod produced by an extrusion process as just outlined was tested for hardness, and a hardness of about 275 VHN was achieved.

The addition of minor amounts of carbon to the powder mixture makes it possible to obtain grain sizes well below 1 micron and the obtainment of martensite needles well below 1 micron in length. Steels produced in this manner may have microstructures giving the steel strengths above $10^6$ pounds per square inch.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What I claim as new and desire to secure by Letters Patent of the United States is:

1. A method for producing composite bodies having a metal matrix and a metal oxide dispersion in the matrix comprising, preparing a mixture of submicron-size matrix metal oxide particles and submicron-size dispersion metal oxide particles, reducing the matrix metal oxide particles to the metallic state while retaining the dispersion particles in oxide form, subjecting the metal-metal oxide mixture to an environment rendering the submicron-size matrix metal particles non-pyrophoric, comminuting the mixture in a liquid medium nonoxidizing to the matrix metal and dispersion metal oxide particles to reduce the size of any agglomerates formed during reduction of the matrix metal oxide particles, shaping the mixture to form a green body and firing for a time sufficient to remove residual liquid media carried from the comminuting operation, and effecting a second compaction and simultaneous firing to increase the density of the compact.

2. A method for producing composite bodies having a metal matrix and a metal oxide dispersion in the matrix comprising, preparing a mixture of submicron-size matrix metal oxide particles from the group consisting of iron, nickel, cobalt, copper, molybdenum, tungsten, tantalum, niobium, and combinations thereof and submicron-size dispersion metal oxide particles from the group consisting of aluminum oxide, magnesium oxide, zirconium oxide, thorium oxide, hafnium oxide, calcium oxide, and combinations thereof, reducing the matrix metal oxide particles to the metallic state while retaining the dispersion particles in oxide form, subjecting the metal-metal oxide mixture to an environment rendering the submicron-size matrix metal particles non-pyrophoric, comminuting the mixture in a liquid medium nonoxidizing to the matrix metal and dispersion metal oxide particles to reduce the size of any agglomerates formed during reduction of the matrix metal oxide particles, shaping the mixture to form a green body and firing for a time sufficient to remove residual liquid media carried from the comminuting operation, and effecting a second compaction and simultaneous firing to increase the density of the compact.

3. A method for producing composite bodies having a metal matrix and a metal oxide dispersion in the matrix comprising, preparing a mixture of submicron-size matrix metal oxide particles from the group consisting of iron, nickel, cobalt, copper, molybdenum, tungsten, tantalum, niobium, and combinations thereof and submicron-size dispersion metal oxide particles from the group consisting of aluminum oxide, magnesium oxide, zirconium oxide, thorium oxide, hafnium oxide, calcium oxide, and combinations thereof, reducing the matrix metal oxide particles in a hydrogen atmosphere at temperatures from about 450° C. to 550° C. to the metallic state while retaining the dispersion particles in oxide form, subjecting the metal-metal oxide mixture to an environment rendering the submicron-size matrix metal particles non-pyrophoric, comminuting the mixture in a liquid medium nonoxidizing to the matrix metal and dispersion metal oxide particles to reduce the size of any agglomerates formed during reduction of the matrix metal oxide particles, shaping the mixture to form a green body and firing for a time sufficient to remove residual liquid media carried from the comminuting operation, and effecting a second compaction and simultaneous firing at a temperature no lower than about 700° C. to increase the density of the compact.

4. A method for producing composite bodies having a metal matrix and a metal oxide dispersion in the matrix comprising, preparing a mixture of submicron-size matrix metal oxide particles and submicron-size dispersion metal oxide particles, reducing the matrix metal oxide particles to the metallic state while retaining the dispersion particles in oxide form, subjecting the metal-metal oxide mixture to liquid nitrogen to render the submicron-size matrix metal particles non-pyrophoric, comminuting the mixture in a liquid medium nonoxidizing to the matrix metal and dispersion metal oxide particles to reduce the size of any agglomerates formed during the reduction of the matrix metal oxide particles, shaping the mixture to form a green body and firing for a time sufficient to remove residual liquid media carried from the comminuting operation, and effecting a compaction and simultaneous firing to increase the density of the compact.

References Cited by the Examiner

UNITED STATES PATENTS

| | | | |
|---|---|---|---|
| 2,852,367 | 9/58 | Goetzel et al. | 75—201 |
| 2,893,859 | 7/59 | Triffleman | 75—206 |
| 3,024,110 | 3/62 | Funkhouser et al. | 75—206 |

FOREIGN PATENTS

| | | |
|---|---|---|
| 797,577 | 7/58 | Great Britain. |
| 826,894 | 1/60 | Great Britain. |

CARL D. QUARFORTH, *Primary Examiner.*

REUBEN EPSTEIN, *Examiner.*